United States Patent
Winter et al.

(10) Patent No.: US 8,157,160 B2
(45) Date of Patent: *Apr. 17, 2012

(54) METER REGISTER AND REMOTE METER READER UTILIZING A STEPPER MOTOR

(75) Inventors: Dan Winter, Pardessia (IL); Ronald N. Koch, Pittsburgh, PA (US)

(73) Assignee: Arad Measuring Technologies Ltd. (IL)

(*) Notice: Subject to any disclaimer, the term of this patent is extended or adjusted under 35 U.S.C. 154(b) by 0 days.

This patent is subject to a terminal disclaimer.

(21) Appl. No.: 12/821,616

(22) Filed: Jun. 23, 2010

(65) Prior Publication Data

US 2010/0302061 A1  Dec. 2, 2010

Related U.S. Application Data

(63) Continuation of application No. 10/864,308, filed on Jun. 9, 2004, now Pat. No. 7,775,422.

(60) Provisional application No. 60/478,235, filed on Jun. 13, 2003, provisional application No. 60/547,716, filed on Feb. 25, 2004.

(51) Int. Cl.
*G06F 17/00* (2006.01)
*G06F 7/00* (2006.01)
*G06K 7/00* (2006.01)
*G06M 1/12* (2006.01)
*G01F 1/00* (2006.01)
*G01F 25/00* (2006.01)
*G08B 23/00* (2006.01)
*G01P 21/00* (2006.01)

(52) U.S. Cl. ............... 235/200 R; 235/375; 235/435; 235/376; 73/861; 73/1.16; 340/870.02

(58) Field of Classification Search ............ 340/870.02, 340/870.07; 73/861.88, 861.93, 1.16, 1.23, 73/1.27, 1.28, 1.35, 861, 727 A; 235/375, 235/435, 376

See application file for complete search history.

(56) References Cited

U.S. PATENT DOCUMENTS

| | | | | |
|---|---|---|---|---|
| 2,972,885 | A | * | 2/1961 | Laub .................... 73/204.14 |
| 3,388,388 | A | | 6/1968 | Brown |
| 3,388,595 | A | * | 6/1968 | Last et al. ................ 73/861.94 |
| 3,518,880 | A | | 7/1970 | Kullmann et al. |
| 3,552,208 | A | | 1/1971 | Destache et al. |
| 3,580,421 | A | * | 5/1971 | Bickford .................... 222/27 |

(Continued)

FOREIGN PATENT DOCUMENTS

JP  11110682 A  4/1999

(Continued)

*Primary Examiner* — Daniel Walsh
(74) *Attorney, Agent, or Firm* — The Webb Law Firm

(57) ABSTRACT

A meter for flowing material, e.g., water, has a meter register having an electronic display, e.g., an LED or LCD display, and a mechanical read-out display driven by a stepper motor to record units of water that flowed through the meter. In the event of an electrical power failure, the LED or LCD readout values are lost, however, the mechanical read-out values remain. Further, signals are transmitted to a microprocessor of a meter register to change the rotation of the stepper motor so that the meter register can be used with different types of meters. Still further, a meter generator co-acting with a meter register forwards an electrical pulse signal after a quantity of material or utility passes through a water meter to a microprocessor of a remote reader. The remote reader includes an odometer coupled to a stepper motor.

21 Claims, 5 Drawing Sheets

U.S. PATENT DOCUMENTS

| | | | | |
|---|---|---|---|---|
| 3,618,061 | A * | 11/1971 | Livers | 73/30.01 |
| 3,641,806 | A * | 2/1972 | Lee et al. | 73/1.28 |
| 3,646,539 | A | 2/1972 | Becker | |
| 3,667,495 | A | 6/1972 | Schuler et al. | |
| 3,676,875 | A * | 7/1972 | Adams et al. | 340/870.03 |
| 3,680,378 | A * | 8/1972 | Aurilio et al. | 73/861.77 |
| 3,688,091 | A | 8/1972 | Painley | |
| 3,729,727 | A | 4/1973 | Young et al. | |
| 3,733,904 | A * | 5/1973 | Bonner et al. | 73/233 |
| 3,759,100 | A | 9/1973 | Medwig et al. | |
| 3,798,634 | A | 3/1974 | Kamada | |
| 3,806,904 | A | 4/1974 | Weinberger et al. | |
| 3,813,597 | A | 5/1974 | Le Vitt | |
| 3,846,789 | A | 11/1974 | Germer et al. | |
| 3,992,705 | A * | 11/1976 | Langenfeld | 340/870.05 |
| 4,022,977 | A * | 5/1977 | Nomura | 379/106.03 |
| 4,032,805 | A | 6/1977 | Hereford | |
| 4,090,220 | A | 5/1978 | Gargini | |
| 4,119,948 | A * | 10/1978 | Ward et al. | 340/870.02 |
| 4,134,026 | A | 1/1979 | Sone et al. | |
| 4,204,194 | A * | 5/1980 | Bogacki | 340/870.02 |
| 4,275,291 | A | 6/1981 | Feller | |
| 4,288,788 | A | 9/1981 | Rogers et al. | |
| 4,315,523 | A * | 2/1982 | Mahawili et al. | 137/486 |
| 4,345,480 | A | 8/1982 | Basham et al. | |
| 4,359,684 | A | 11/1982 | Ley | |
| 4,404,638 | A | 9/1983 | Yada et al. | |
| 4,665,359 | A * | 5/1987 | Goodwin | 324/110 |
| 4,676,112 | A * | 6/1987 | Uematsu et al. | 73/861.17 |
| 4,683,472 | A * | 7/1987 | Beling | 340/870.02 |
| 4,710,919 | A * | 12/1987 | Oliver et al. | 370/242 |
| 4,896,105 | A | 1/1990 | Engel et al. | |
| 4,918,994 | A | 4/1990 | Kramer | |
| 5,000,041 | A | 3/1991 | Miyamoto et al. | |
| 5,111,407 | A * | 5/1992 | Galpern | 702/62 |
| 5,138,888 | A | 8/1992 | Walmer, Sr. | |
| 5,143,257 | A | 9/1992 | Austin et al. | |
| 5,155,481 | A * | 10/1992 | Brennan et al. | 340/870.02 |
| 5,243,338 | A * | 9/1993 | Brennan et al. | 340/870.02 |
| 5,252,967 | A * | 10/1993 | Brennan et al. | 340/870.02 |
| 5,270,949 | A * | 12/1993 | Atherton et al. | 702/62 |
| 5,284,053 | A | 2/1994 | Wadlow et al. | |
| 5,298,894 | A * | 3/1994 | Cerny et al. | 340/870.02 |
| 5,335,211 | A | 8/1994 | Muto et al. | |
| 5,448,229 | A * | 9/1995 | Lee, Jr. | 340/870.02 |
| 5,493,917 | A | 2/1996 | Clanin | |
| 5,519,387 | A | 5/1996 | Besier et al. | |
| 5,540,107 | A * | 7/1996 | Silverman et al. | 73/861.78 |
| 5,621,419 | A | 4/1997 | Meek et al. | |
| 5,659,300 | A * | 8/1997 | Dresselhuys et al. | 340/870.02 |
| 5,659,303 | A | 8/1997 | Adair, Jr. | |
| 5,691,484 | A | 11/1997 | Feller | |
| 5,721,383 | A * | 2/1998 | Franklin et al. | 73/861.77 |
| 5,747,703 | A * | 5/1998 | Plisson et al. | 73/861.77 |
| 5,789,672 | A | 8/1998 | Rogers et al. | |
| 5,825,303 | A | 10/1998 | Bloss, Jr. et al. | |
| 5,831,176 | A * | 11/1998 | Morgenthale et al. | 73/861.77 |
| 5,877,703 | A | 3/1999 | Bloss, Jr. et al. | |
| 5,927,400 | A | 7/1999 | Bononi et al. | |
| 5,929,345 | A | 7/1999 | Gadini | |
| 5,959,550 | A | 9/1999 | Giles | |
| 5,986,574 | A * | 11/1999 | Colton | 340/870.02 |
| 6,012,339 | A * | 1/2000 | Genack et al. | 73/861.77 |
| 6,079,263 | A | 6/2000 | Beddies | |
| 6,085,586 | A * | 7/2000 | Arvidson et al. | 73/201 |
| 6,085,599 | A | 7/2000 | Feller | |
| 6,087,957 | A | 7/2000 | Gray | |
| 6,098,456 | A | 8/2000 | Munck | |
| 6,177,883 | B1 | 1/2001 | Jennetti et al. | |
| 6,181,294 | B1 | 1/2001 | Porter et al. | |
| 6,195,018 | B1 * | 2/2001 | Ragle et al. | 340/870.01 |
| 6,255,748 | B1 | 7/2001 | Allcorn | |
| 6,257,074 | B1 | 7/2001 | Kellerman | |
| 6,284,129 | B1 | 9/2001 | Giordano et al. | |
| 6,346,914 | B1 | 2/2002 | Annamaa | |
| 6,369,719 | B1 * | 4/2002 | Tracy et al. | 340/870.02 |
| 6,502,468 | B1 * | 1/2003 | Thornborough | 73/861.78 |
| 6,741,942 | B2 * | 5/2004 | Kapitulskiy et al. | 702/45 |
| 7,135,986 | B2 * | 11/2006 | Winter | 340/870.02 |
| 7,267,014 | B2 * | 9/2007 | Winter | 73/861.79 |
| 7,397,389 | B2 * | 7/2008 | Buhl | 340/870.02 |
| 7,446,672 | B2 * | 11/2008 | Johnson et al. | 340/870.02 |
| 7,663,503 | B2 * | 2/2010 | Winter | 340/870.02 |
| 7,775,422 | B2 * | 8/2010 | Winter et al. | 235/200 R |
| 7,920,983 | B1 * | 4/2011 | Peleg et al. | 702/100 |
| 2001/0000060 | A1 | 3/2001 | Toma et al. | |
| 2001/0024165 | A1 | 9/2001 | Steen, III et al. | |
| 2002/0039068 | A1 * | 4/2002 | Holowick | 340/870.02 |
| 2002/0108452 | A1 * | 8/2002 | Williams | 73/861.75 |
| 2002/0145568 | A1 * | 10/2002 | Winter | 343/701 |
| 2003/0080876 | A1 * | 5/2003 | Martin | 340/870.02 |
| 2003/0106380 | A1 | 6/2003 | Bonne et al. | |
| 2003/0233885 | A1 | 12/2003 | Bird et al. | |
| 2004/0006439 | A1 * | 1/2004 | Hunter | 702/61 |
| 2004/0084081 | A1 | 5/2004 | Liu et al. | |
| 2004/0113810 | A1 * | 6/2004 | Mason et al. | 340/870.02 |
| 2004/0211267 | A1 * | 10/2004 | Higgins | 73/861.86 |
| 2005/0000302 | A1 * | 1/2005 | Winter | 73/861.77 |
| 2005/0007260 | A1 * | 1/2005 | Winter et al. | 340/870.01 |
| 2005/0033701 | A1 * | 2/2005 | Challener et al. | 705/63 |
| 2005/0066746 | A1 * | 3/2005 | Winter | 73/861.42 |
| 2005/0068193 | A1 * | 3/2005 | Osterloh et al. | 340/870.02 |
| 2006/0071813 | A1 * | 4/2006 | Kagan | 340/870.02 |
| 2006/0145890 | A1 * | 7/2006 | Junker et al. | 340/870.11 |
| 2006/0162467 | A1 * | 7/2006 | Winter | 73/861.79 |
| 2006/0218104 | A1 * | 9/2006 | Johnson et al. | 705/412 |
| 2006/0227006 | A1 * | 10/2006 | Gould et al. | 340/870.02 |
| 2007/0033985 | A1 * | 2/2007 | Winter | 73/1.41 |
| 2007/0035414 | A1 * | 2/2007 | Welles et al. | 340/870.02 |
| 2007/0109209 | A1 * | 5/2007 | Winter | 343/719 |
| 2007/0176789 | A1 * | 8/2007 | Kim | 340/870.02 |
| 2007/0193334 | A1 * | 8/2007 | Hays | 73/1.34 |
| 2007/0205915 | A1 * | 9/2007 | Shuey et al. | 340/870.02 |
| 2008/0177678 | A1 * | 7/2008 | Di Martini et al. | 705/412 |
| 2008/0209985 | A1 * | 9/2008 | Winter | 73/40.5 R |
| 2009/0019947 | A1 | 1/2009 | Henry et al. | |
| 2009/0099794 | A1 * | 4/2009 | Boulanger et al. | 702/47 |
| 2009/0173168 | A1 * | 7/2009 | Cottam et al. | 73/861.19 |
| 2009/0224937 | A1 * | 9/2009 | Gillette et al. | 340/870.02 |
| 2009/0255346 | A1 * | 10/2009 | Hendey et al. | 73/861.77 |
| 2009/0301220 | A1 * | 12/2009 | Smets et al. | 73/861.351 |
| 2009/0309755 | A1 * | 12/2009 | Williamson et al. | 340/870.02 |
| 2010/0073191 | A1 * | 3/2010 | Beverung et al. | 340/870.02 |
| 2010/0199747 | A1 * | 8/2010 | Barna et al. | 73/40.7 |
| 2010/0219982 | A1 * | 9/2010 | Villessot et al. | 340/870.02 |
| 2011/0215945 | A1 * | 9/2011 | Peleg et al. | 340/870.02 |

FOREIGN PATENT DOCUMENTS

| | | |
|---|---|---|
| WO | 0201164 A1 | 1/2002 |
| WO | 02073735 A2 | 9/2002 |
| WO | 02088642 A1 | 11/2002 |

* cited by examiner

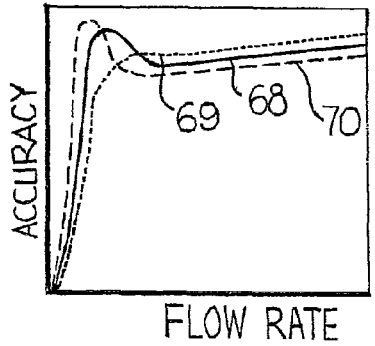
Fig. 7a
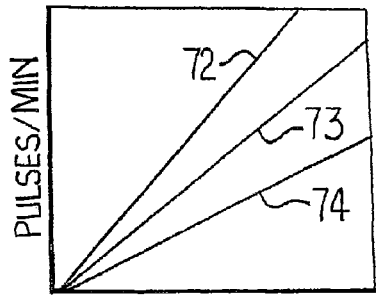
Fig. 7b
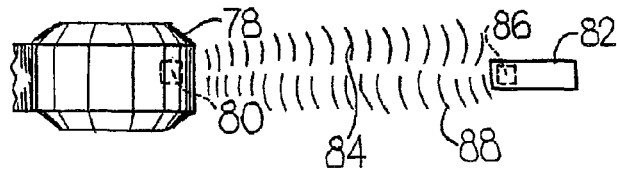
Fig. 8
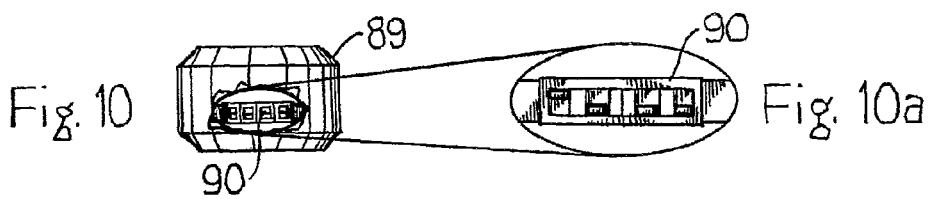
Fig. 9
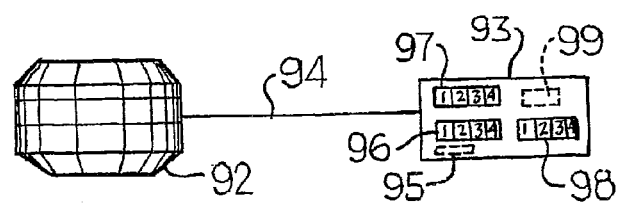
Fig. 10, Fig. 10a
Fig. 11

METER REGISTER AND REMOTE METER READER UTILIZING A STEPPER MOTOR

CROSS REFERENCE TO RELATED APPLICATIONS

This application is a continuation of U.S. patent application Ser. No. 10/864,308, filed on Jun. 9, 2004, now U.S. Pat. No. 7,775,422. The present application claims the benefit of U.S. Provisional Application Ser. No. 60/478,235, filed Jun. 13, 2003, and U.S. Provisional Application Ser. No. 60/547,716, filed Feb. 25, 2004, which applications are hereby incorporated by reference in their entirety.

BACKGROUND OF THE INVENTION

1. Field of the Invention

The present invention relates to meter registers for measuring quantity of flowed material, e.g., water, and remote meter readers connected to meter registers and, more particularly, to meter registers utilizing a stepper motor to rotate wheel(s) of an odometer, and to indoor and outdoor remote meter readers connected to a meter register, the meter reader utilizing a stepper motor to rotate wheel(s) of an odometer.

2. Description of Related Art

Meters, such as water meters or gas meters, measure the quantity and, in some cases, the flow rate of a fluid passing therethrough. Generally speaking, these meters include meter registers. The register is coupled with the meter body measuring chamber and records the volume of material flowing therethrough. Early prior art water meters had the meter registers directly coupled to the measuring chambers. This coupling included a drive shaft attached to an element of the drive chamber, which then drove a plurality of gears in the meter register driving an odometer. Although these geared arrangements are reliable, they are expensive and effected the accuracy of the measuring chamber through the friction caused by the gears and mechanical seals. Subsequently, the meter registers and measuring chambers changed and utilized magnetic couplings. This permitted the advent of a sealed register. The prior art sealed registers utilized a magnetic follower provided within the register, which co-acted with a magnetic driver provided in the meter body. The magnetic follower was coupled to a geared arrangement which drives an odometer. The magnetic follower is magnetically driven by the magnetic driver, causing the geared arrangement to drive the odometer. The sealed registers still have the reduced wear problems and frictional problems associated with the prior art direct drive registers.

Subsequently, electronic registers were developed, for example, as disclosed in commonly assigned PCT Publication No. WO 02/073735 (hereinafter also referred to as "WO 02/073735"). The meter register disclosed in WO 02/073735 includes magnetic followers from which a pulse is used to create an electric signal through a battery-powered circuit board provided in the register. The electronic signal is used to provide information relating to the volume of material flowing through the meter. The battery also supplies power to an LED or LCD so that a measurement reading, such as the amount of fluid passing through the meter, can be taken via a meter reader. With the advent of remote metering, the necessity of an LED or LCD, or for that matter a mechanical read-out, such as the gear driven odometer, generally is not necessary. However, should there be an electrical malfunction or the battery have insufficient electrical voltage to operate the LED or LCD, a subsequent reading cannot be taken. Hence, the volume of fluid that passed through the meter during the last billing period could be lost. Therefore, it is an object of the present invention to provide a meter register to overcome this problem.

Further, there are many different manufacturers of meters and different styles of meters, such as in the case of fluid measurement, that includes multi-jet meters or positive displacement meters. Generally speaking, each of these meters requires its own particular meter register that not only correlates the magnetic movements to the volume of fluid flowing through the meter but also includes the appropriate gearing for the particular type of meter. For example, a ¾ A inch (20 millimeter ("mm")) positive displacement meter must have its own unique register and cannot use the same meter register as a 1 inch (25 mm) positive displacement meter even for meters provided from the same manufacturer. This can be extremely costly to the manufacturer to provide different meter register designs. Further, if a utility has different meters being supplied thereto or meters having different units of measurement, it must have different registers for each of those meters. Therefore, it is an object of the present invention to provide a meter register that can be used with more than one meter unit/register and meter size.

SUMMARY OF THE INVENTION

The present invention relates to a utility meter register having an electronic transmitter that transmits information via a communication link to a separate receiver. The register also includes a mechanical odometer and a sweep hand or other indicator of flowed material, e.g., water, driven by stepper motors.

Further, the present invention relates to a utility meter register that can be retrofitted to many styles and sizes of meters. The remote register includes a look-up table having characteristic flow information about various sizes and types of meters. The meter register is then activated to emulate a specific meter register characteristic.

Still further, the present invention relates to a utility meter registration system that utilizes a remote reader system. The remote reader system includes an arrangement to use information generated from a meter reading system causing a mechanical odometer to be driven by a stepper motor.

BRIEF DESCRIPTION OF THE DRAWINGS

FIG. 7A is a graph showing the accuracy versus flow rate of various meters;

FIG. 7B is a graph showing the pulses per minute versus flow rate of various meters;

FIG. 8 is a table showing codes corresponding to various types of meters;

FIG. 9 is a graphic representation of a meter register made in accordance with the present invention being programmed for use with a specific meter;

FIG. 10 is a meter register made in accordance with the present invention having switches to enable the meter register to be used with various meters;

FIG. 10A is an enlarged view of the circled area of FIG. 10 showing a bank of switches;

FIG. 11 is a meter register made in accordance with the present invention connected to an off-site meter reading device having the aforementioned switches shown in FIG. 10A;

DETAILED DESCRIPTION OF THE INVENTION

Figure 1:
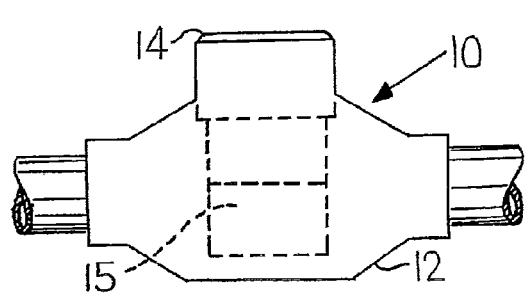
FIG. 1 is a side elevational view of a utility meter.

In the following discussion of the non-limiting embodiments of the invention, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the practice of the invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, and all subranges in between, e.g., 1 to 6.3, or 5.5 to 10, or 2.7 to 6.1. Also, as used herein, terms such as "positioned on" or "supported on" mean positioned or supported on but not necessarily in direct contact with the surface.

Further, in the discussion of the non-limiting embodiments of the invention, it is understood that the invention is not limited in its application to the details of the particular non-limiting embodiments shown and discussed since the invention is capable of other embodiments. Further the terminology used herein is for the purpose of description and not of limitation and, unless indicated otherwise, like reference numbers refer to like elements.

The non-limiting embodiments of the invention are discussed for use on a water meter; however, as will be appreciated, the invention is not limited thereto, and the non-limiting embodiments of the invention can be used with any type of signal transmitting device, e.g., but not limiting the invention thereto, any type of signal transmitting meter measuring the movement of materials, e.g., but not limiting the invention thereto, fluids, such as water and gas. Although not limiting to the invention, the water meter in the following discussion is of the type disclosed in WO 02/073735, which document is hereby incorporated by reference. A general discussion of the water meter disclosed in WO 02/073735 is presented herein; for a detailed discussion of the water meter, reference can be made to WO 02/073735.

FIG. 1 shows a utility meter 10, for example, a water meter of the type disclosed in WO 02/073735. The meter 10 includes a meter body 12, a meter register 14, and a flow-measuring chamber 15. The invention is not limited to the flow-measuring chamber and any of the types used in the art, e.g., a positive displacement chamber or a vane or multi-jet measuring chamber, can be used in the practice of the invention. In operation, the measuring chamber typically has a moving measuring element which drives a magnetic drive gear that is magnetically coupled to a magnetic follower gear provided in the meter register 14. In this manner, the register 14 can be sealed and not directly coupled to the driving member in the flow-measuring chamber 15.

Figure 2:
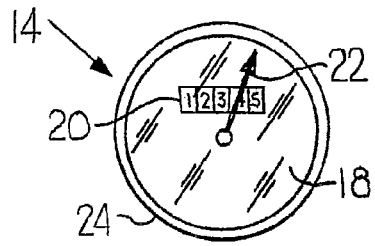
FIG. 2 is a top plan view of a prior art meter register.

Referring to FIG. 2, there is shown a top view of a prior art meter register also designated by the number 14. Typically, the prior art register 14 includes a face plate 18 having an odometer 20 and a wheel, sweep hand, or dial 22. Rotation of the magnetic follower causes the dial 22 to rotate and various gears to rotate driving the odometer 20.

Figure 3:
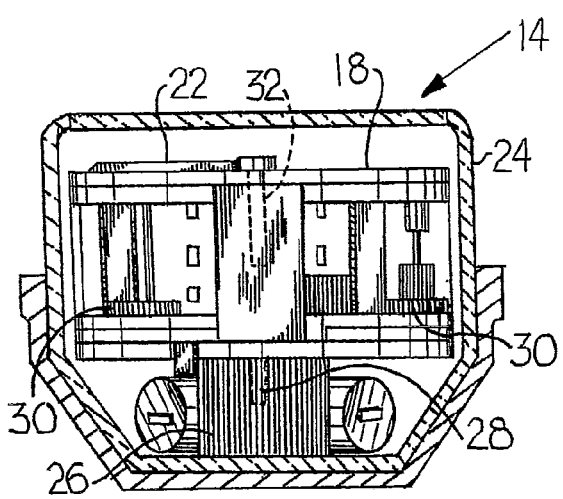
FIG. 3 is a side elevational view of the meter shown in FIG. 2.

Referring now to FIGS. 2 and 3, the register 14 further includes a body or cup 24 into which a magnetic follower 26 is received. A drive shaft 28 is attached to the magnetic follower 26. A drive gear (not shown) is attached to the drive shaft 28 and a plurality of gears 30 co-act with the drive gear. A drive shaft 32 is attached to one of the gears and, in turn, is attached to the dial 22. A lens 34 is attached to the body or cup 24 to provide a sealed register having a window to view the face plate 18. Rotation of the magnetic follower 26 causes the drive shaft 28 to rotate, thereby causing the drive gear (not shown) and gears 30 to rotate which, in biro, causes the drive shaft 32 and dial 22 to rotate. Rotation of the gears 30 also drives the odometer 20.

Figure 4:
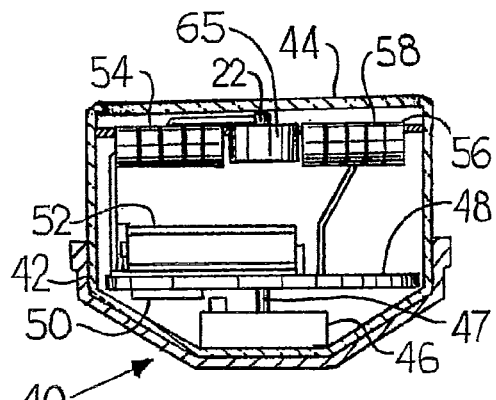
FIG. 4 is a side elevational view, partially in section, of a meter register made in accordance with the present invention.
Figure 5:
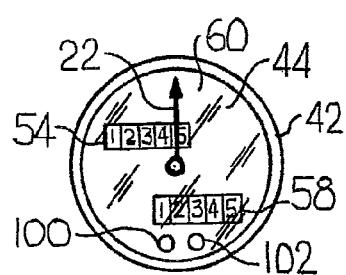
FIG. 5 is a top plan view of the register shown in FIG. 4.
Figure 6:
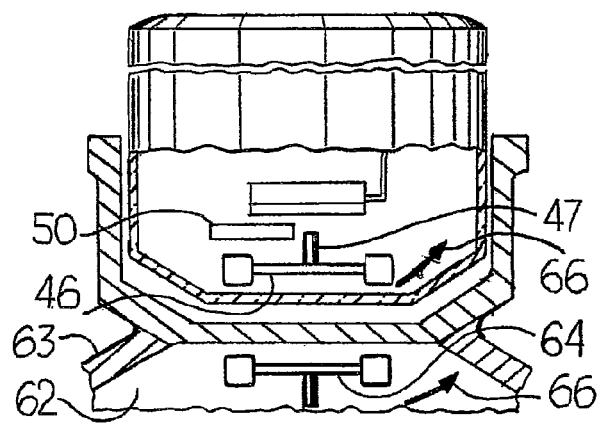
FIG. 6 is a partial sectional elevational view of the meter register shown in FIG. 4 co-acting with a meter.
Figure 12:
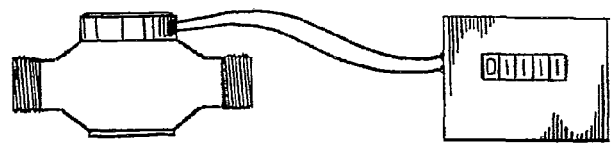
FIG. 12 is a side elevational view of a remote meter reading system made in accordance with the present invention.

Shown in FIGS. 4-6 is a register 40 made in accordance with the present invention. The register 40 includes a body or cup 42 and a lens 44 similar to the prior art register 14. A magnetic follower 46 is provided and is rotatably coupled by a drive shaft 47 to a circuit board 48 having a microprocessor. Magnetically-activated switches or reed switches 50 (only one shown in FIGS. 4 and 6) are provided on the bottom surface of the circuit board 48 and are adapted to be activated and deactivated by the magnetic follower 46. The microprocessor is coupled to the reed switches 50 and a battery 52. The reed switches 50 indicate rotation of the measuring chamber in a manner discussed below. A light-emitting display (LED) or liquid crystal display (LCD) 54 (clearly shown in FIG. 5) is provided and electrically coupled to the circuit board 48 and the battery 52 in any convenient manner Likewise, a stepper motor or stepper solenoid 56 is provided and electrically coupled to the microprocessor of the circuit board 48 and the battery 52. In one non-limiting embodiment of the invention, the stepper motor 56 is mechanically coupled to an odometer 58 (clearly shown in FIG. 5). The stepper motor 56 can be the same type of motor used in many battery-powered watches. For example, but not limiting to the invention, the shaft of the stepper motor rotates on the order of 3.6° per pulse and operates off of a DC power, e.g., the battery 52. A face plate 60 (clearly shown in FIG. 5) is provided having appropriate cutouts for LCD or LED 54 and the odometer display 58. The meter register 40 is adapted to be coupled or attached to a meter body 63, which has a drive magnet 64. A second stepper motor 65 is provided to drive the sweep hand 22. The stepper motor 65 is also coupled to the microprocessor.

With reference to FIG. 6, in operation, the measuring chamber 62 of the meter or meter body 63 drives the drive magnet 64 in a first direction 66. The magnetic forces of the drive magnet 64 cause the magnetic follower 46 to, likewise, rotate in the first direction 66. Magnetic impulses activate and deactivate the reed switches 50 which indicate rotation of the measuring chamber and emit electrical pulses to the microprocessor. The microprocessor correlates pulses to a volume of flow and/or a flow rate and, in turn, sends a signal to the LED or LCD 54 to indicate the flow rate of material through the meter 63. Alternatively, the LED or LCD 54 can indicate the volume of material that has flowed through the meter 63. Simultaneously, the circuit board 48, via the microprocessor, sends a signal to the stepper motor or the stepper solenoid 56, which causes a stepper motor or stepper solenoid shaft (not shown) to rotate, which, in turn, causes the odometer 58, a mechanical, gear driven device to indicate the volume of material that has flowed through the meter 63. Alternatively, the stepper motor or stepper solenoid 56 can drive the gearing coupled to the odometer 58. Optionally, the circuit board 48 can also send a signal to an antenna which, in turn, sends a signal to an off-site meter reading device that records a volume of material that has flowed through the meter 63. For a discussion regarding meter registers transmitting signals to an off-site meter reading device, reference can be made to WO 02/073735.

In the event the battery 52 dies or there is an electrical malfunction of the circuit board 48, the LED or LCD 54 will lose its respective reading, and the stepper motor 56 will cease to drive the odometer 58. Likewise, in this event, the memory of the microprocessor will also lose the information (unless equipped with an expensive non-volatile memory) contained therein relating to the meter reading, such as the amount of material that has flowed through the meter. However, in the practice of the invention, even though the stepper motor 56 will cease driving the odometer 58, the reading on the odometer 58 remains. This reading on the odometer 58 indicates the amount of material that has flowed through the meter just prior to when the battery died and/or the electrical malfunction of the circuit board 48 occurred. Hence, a meter reader can make a visual reading of the odometer. The odometer reading is a quantity of material, e.g., but not limiting to the invention, water, that passed through the meter since the last meter reading when the batteries and/or circuit board were operational. Although the odometer reading will stop when the battery dies and/or circuit board becomes non-operational, it will have a reading that is indicative of some quantity of material passing through the meter subsequent to the last reading. Hence, a utility provider, for example, may recoup some fees for utility use during the period when the meter register stopped recording usage. In other words, the utility provider can collect fees for the period beginning at the time the meter was last read and ending at the time the battery 52 died and/or the electrical malfunction of the circuit board 48 occurred.

As can now be appreciated by those skilled in the art, the present invention overcomes problems and limitations of the prior art meter registers. More particularly, utilities using meter registers having electronic meter registers with LED's and LCD's can lose substantial revenue if the battery dies or if there is an electrical malfunction. Meter registers incorporating features of the invention have the stepper motor 56 and odometer 58 to overcome this problem. Further, the totally mechanical register of the prior art is expensive to manufacture relative to the electronic register as described herein using a stepping motor or stepping solenoid to drive an odometer. Another advantage of the present invention over the prior art is that the drag caused by the gearing onto the magnetic follower gear is eliminated by the present invention, resulting in a meter with more accurate readings of water usage. Further, the present invention permits a comparison of the LED 54 reading and the odometer 58 reading that can be indicative if there is a malfunction in the register if the readings are significantly different. Another advantage of the present invention is that the meter register 14 looks like a mechanical register, even though it processes the meter information via electronic means. This is especially true if the LED 54 reading is not present. Also, the present invention can provide flow rate information on the LED 54 reading in lieu of volume, in which case it will assist in leak detection. Also, it is believed that in lieu of an LED or LCD arrangement 54, the stepper motor 56 and odometer arrangement 58 can be used. Hence, the register 40 will have an appearance similar to the prior art register 14. Furthermore, in lieu of the magnetic follower 46, magnetic activated switches, such as reed switches 50, may be provided to co-act with the drive magnet 64 and to eliminate the magnetic follower 46 co-acting with the reed switches 50. Hence, the rotation of the drive magnet 64 will generate magnetic pulses to the magnetically activated switches (reed switches 50), which will then be electronically coupled to the circuit board 48. This reduces drag on the drive magnet 64 in the meter body and is believed to improve accuracy of the meter.

Another problem discussed in the background of the invention relates to meter registers having to be uniquely designed for not only different manufacturers of meters, but also different sizes and styles of meters manufactured by that manufacturer. With reference to FIG. 7A, every meter has a performance curve, e.g., for a standard W Series Turbo sold by Sensus, the expected performance curve is curve 68; for a propeller meter sold by Sensus, the expected performance curve is curve 69; and for multijet meter (PMM) sold by Sensus, the expected performance curve is curve 70 with respect to accuracy at each flow rate. Further, each meter register has a unique relationship of magnetic pulses per minute that correspond to a flow rate, e.g., with reference to FIG. 7B, a multijet meter register sold by Master Meter has the expected relationship shown by curve 72; a turbine meter register sold by Badger Meter has the expected relationship shown by curve 73; and positive displacement meter register sold by Neptune has the expected relationship shown by curve 74 with respect to magnetic pulses per minute that correspond to flow rate.

The present invention provides computer memory through a microprocessor of various performance curves, various meters, and various size meters as shown in FIG. 8. Specifically, for example, manufacturer A's positive displacement meter for a ⅝" (15 millimeters ("mm")) water meter would have a designation "code 1" and have the performance curve and flow rate versus pulses per minute relationship provided listed on a look-up table provided in computer memory. Likewise, manufacturer B's positive displacement ⅝" (15 mm) water meter would also have the respective performance curve and flow rate versus pulse per minute relationship provided in the look-up table in the computer memory. The same is true for manufacturers C, D, and E multi-jet meters of various sizes.

Referring to FIG. 9, a meter register 78 made in accordance with the present invention is shown that includes a transmitting and receiving antenna 80 in the meter register 78. A signal controller 82 is provided that emits a signal 84 to the meter register 78 by way of a transmitting and receiving antenna 86 provided in the controller 82. The signal controller 82 sends the signal to identify which meter the register 78 is to be coupled. For example, the signal controller 82 can send a signal 84 to indicate that the meter register 78 is to be coupled with a ⅝" (15 mm) multi-jet meter manufactured by manufacturer C and, therefore; the code 3 would be sent to the meter register 78 to program the microprocessor. The meter register 78 could then emit a signal 88 to the signal controller 82 to indicate that the meter register 78 has been programmed for a ⅝" (15 mm) multi-jet water meter manufactured by manufacturer C. Hence, the meter register 78 emulates a meter register for a ⅝ (15 mm) multi-jet meter manufactured by manufacturer C.

Alternatively, as shown in FIGS. 10 and 10A, a meter register 89 can be provided with a bank of switches 90. The switches of the bank of switches 90 can be dip switches which, when arranged in a specific numerical order and/or alphabetical order, is indicative of how the meter register is to perform and with which meter it is to be coupled. For example, but not limiting to the invention, if switch positions provide a designation "1000", it could mean code 1, manufacturer A for a ⅝" (15 mm) positive displacement meter indicating that the meter register 78 has been programmed for a ⅝" (15 mm) positive displacement meter manufactured by manufacturer A. Hence, the meter register 78 emulates a meter register for a ⅝" (15 mm) positive displacement meter manufactured by manufacturer A.

FIG. 11 shows a meter register 92 having a meter reading system, such as the Dialog® meter reading system sold by Master Meter, Inc., with a remote reader 93 coupled to the register via an electrical wire coupling 94. Typically, a battery 95 (shown in phantom) provides power to the remote reader 93. Alternatively, in lieu of the wire coupling 94, a wireless communication arrangement utilizing radio waves could be provided. The remote reader 93 includes a reading member 96 to which a non-contact reader can co-act therewith, such as a Dialog® reader, an LED numerical display 97, and an odometer 98 driven by a stepper motor 99 (shown in phantom) such as that described previously herein, With this arrangement, a signal is sent via the wire coupling 94 or remotely by radio waves to the remote reader 93. The information carried by the signal is stored in the computer of the remote reader 93 and shown by the LED display 97, as well as displayed by the odometer 98, which is driven by the stepper motor 99. In the event the battery 95 should die or the remote meter 93 should have an electrical malfunction, a meter reader can take a reading from the odometer 98. The remote reader can also provide an LCD or LED display indicative of flow rate. Although this would not be the most accurate meter reading of the meter register, as discussed above, having an odometer driven by a stepper motor in combination with an TED display would enable a utility, for example, to charge the end user for the amount of flowed material identified on the odometer as opposed to losing that reading for the whole meter reading period due.

Referring back to FIG. 5, an infrared sensor 100 and an infrared emitter 102 can be provided for receiving and sending infrared signals respectively, which communicate with the microprocessor of the meter register. In this instance, a transponder (not shown) can be used to indicate which type of meter is to be used with the meter register 44. Also, it is possible to optionally calibrate the register for the specific meter to be used. Specifically, the meter and the meter register can be calibrated by corresponding the register meter reading to a specific performance curve. For example, at low flow rates, the pulses of the stepper motor per gallon can be X, and, at medium flow rates, the pulses for stepper motor per gallon can be Y, and, at high flow rates, the pulses of the stepper motor per gallon can be Z. The readings taken from the co-acting of the reed switches 50 (FIGS. 4 and 6) and the magnetic follower 46 can also be calibrated in a similar manner, e.g., the meter can be calibrated in a test stand, or in the field. Also, the odometer 58 driven by the stepper motor or the stepper solenoid 56 can be set at any number, such as "0000", after calibration by passing a signal to the microprocessor via the external infrared sensor 100 to adjust the reading of the odometer to a set value. For example, if a meter register fails in the field and had an odometer reading of "XXXX", the stepper motor driving the odometer can be activated by the microprocessor to yield a reading "XYXZ", or any other number, so that the meter register conforms with a desired value.

Further, because the present invention utilizes only a stepper motor arrangement, the meter register can be used for all types and sizes of fluid meters by adjusting the pulses to drive the stepper motor to adjust the odometer, i.e., for one unit of the fluid, the stepper motor can be pulsed after ten rotations of the magnetic follower 46, while, in another case for one unit of fluid, the stepper motor can be pulsed after fifteen rotations of the magnetic follower 46.

FIGS. 12-18 show a remote meter reading system 110 (FIGS. 13-16) and 111 (FIG. 17) made in accordance with the present invention. Specifically, FIG. 12 generally shows a remote meter reading system 110 that includes a meter, such as a water meter 112. The water meter 112 includes a water meter body having a measuring chamber and meter register. In the practice of the invention, it is preferred to use the meter register 40 incorporating features of the invention and discussed above; however, the invention is not limited to the type or design of the water meter, flow measuring chamber, and/or meter chamber and any of the types described herein and in the prior art, e.g., but not limited to WO 02/073735, can be used in the practice of this embodiment of the invention. A meter generator 114 is coupled to the water meter 112. The type of meter generator is not limiting to the invention. In the practice of the invention, but not limiting thereto, a meter generator sold by Rockwell International under the trademark GTR was used. In general, the meter generator includes an arrangement that co-acts with the meter register or is part of the meter register as is well known in the art, which, after a series of rotations, the meter measuring chamber causes a signal to be generated, e.g., an electric pulse. As can be appreciated, the signal can be generated by an optical reading system or magnetic reading system, which co-acts with the sweep hand of a meter register. Since meter generators are known in the art, no further discussion regarding meter generators is deemed necessary.

Figure 15:
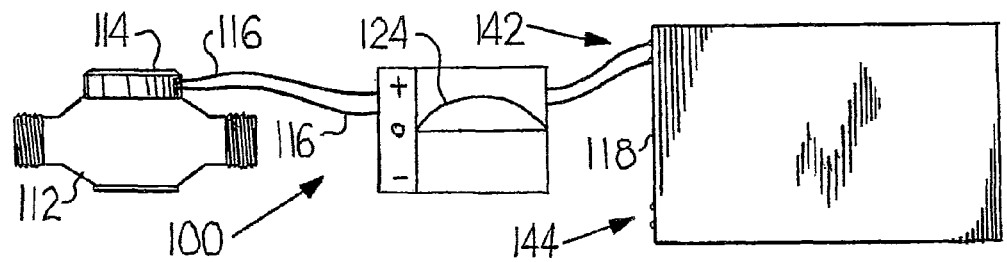
FIG. 15 is a schematic of a remote meter reading system showing a third waveform emitted from the meter reading system.
Figure 16:
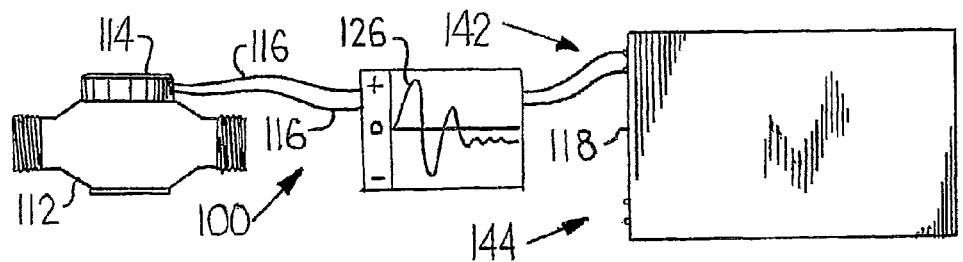
FIG. 16 is a schematic of a remote meter reading system showing a fourth waveform emitted from the meter reading system.
Figure 17:
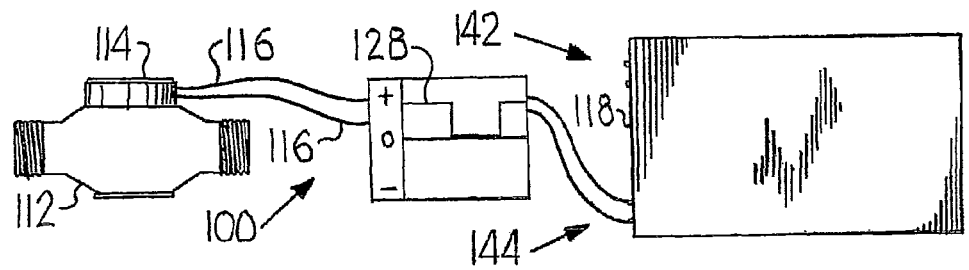
FIG. 17 is a schematic of a remote meter reading system showing a fifth waveform emitted from the meter reading system.

Meter generator 114 shown in FIGS. 13-16 and meter generator 115 shown in FIG. 17 are coupled to a remote reader 118 via wires 116. Prior art arrangements have shown these types of systems whereby an electric voltage pulse generated by the meter generators 114 and 115 drives a motor in the remote reader 118 which, in turn, drives an odometer. A problem in the prior art, however, is that many of these types of meter generators are becoming obsolete. Further, many meter manufacturers utilize a unique generator-type signal to drive the remote reader. Hence, as these remote reader-type systems are phased out by the manufacturers, it is becoming harder to replace them.

Figure 13:
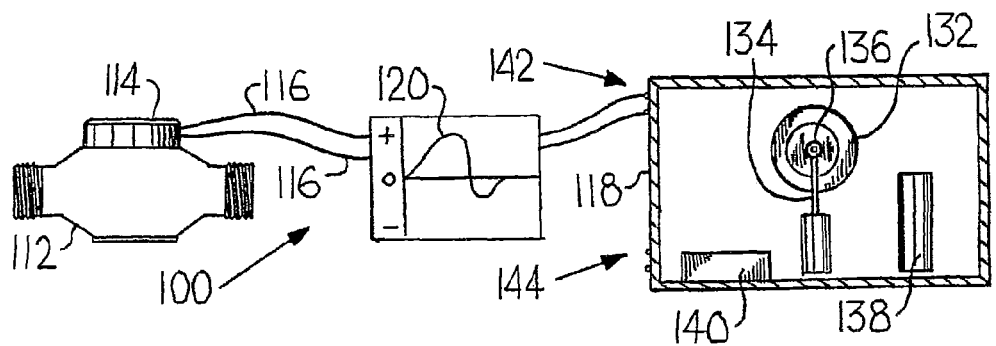
FIG. 13 is a schematic of a remote meter reading system showing a first waveform emitted from the meter reading system.
Figure 14:
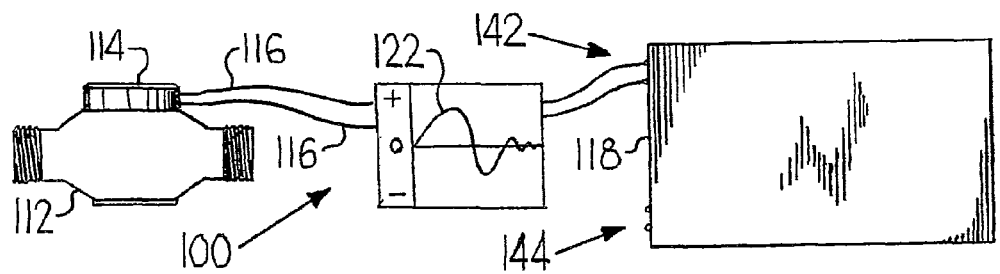
FIG. 14 is a schematic of a remote meter reading system showing a second waveform emitted from the meter reading system.

Shown in FIGS. 13-17 are different types of electric current pulses that can be generated by the meter generator 114, depending on the manufacturer. FIG. 13 shows a first electric voltage pulse signal 120 emitted from the meter generator 114. FIG. 14 shows a second electric voltage pulse signal 122 from the generator 114. FIG. 15 shows a third electric voltage pulse signal 124 from the generator 114. FIG. 16 shows a fourth electric voltage pulse signal 126 from the generator 114. FIG. 17 shows a fifth electric voltage pulse signal 128 from the switch-type generator 115. The signals provide information that can be used to determine a unit of flow through the meter, e.g., but not limiting to the invention, the signal 128 operates on a switch of the generator 115 to close the switch for a certain period of time per pulse. In operation, a pulse indicates a unit of flow through the meter.

Figure 18:
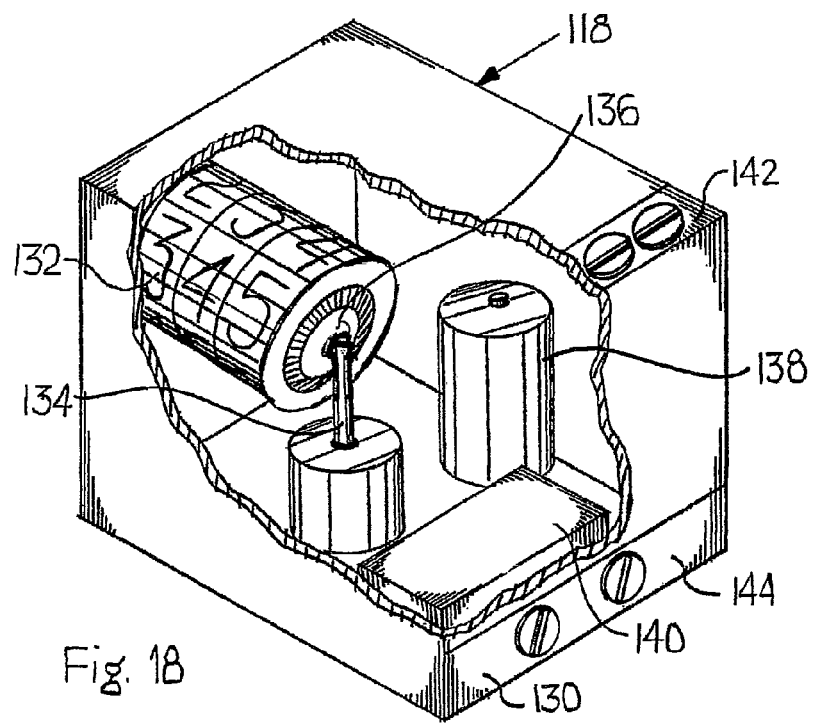
FIG. 18 is a top perspective view of a remote meter reader utilized in the meter reading system shown in FIGS. 12-17 made in accordance with the present invention.

Referring to FIG. 18, the remote reader 118 includes a housing 130 that houses a mechanical odometer 132 having a bank or plurality of wheels 136. A stepper motor 134, rotational or a linear stepper motor, is mechanically linked to the mechanical odometer 132 in a manner known in the art to rotate the wheel(s) of the odometer 132. A battery 138 is provided to provide power to the stepper motor 134 and is electrically coupled to a circuit board 140. Non-polarized connectors 142 and polarized connectors 144 are electrically coupled to the circuit board 140 in any convenient manner, and the circuit board 140 is electrically coupled to the stepper motor 134 in any convenient manner. In operation, the non-polarized meter generator 114, shown in FIGS. 13-15, would be electrically coupled via the wires 116 to the non-polarized connectors 142, and the polarized generator 115 shown in FIG. 17, would be electrically coupled via the wires 116 to the polarized connectors 144. The meter generator 114, having a switch closure arrangement as schematically represented in FIG. 17, would require the meter generator 114 to be electrically coupled via the wires 116 to the non-polarized connectors 142 for the switch closure.

The circuit board 140 includes appropriate filters to accept only positive electric voltage pulses. Further, the circuit board 140 includes circuitry that compares if voltage from the generators is above six volts. Further, the circuit board 140 includes circuitry that can determine if the positive voltage pulse times are greater than fifteen milliseconds. The circuit board 140 has circuitry that converts the positive portion of the electric voltage pulses from the meter generators 114, 115 to a digital signal. The digital signal is amplified using the power from the battery and sends the appropriate electric signal to the stepper motor 134 to cause the appropriate wheel (s) 136 of the odometer 132 to rotate. The stepper motor 134 will then advance a first odometer wheel a fixed amount, for example, either 3.6 or 36°, per pulse. In the case where a switched-type meter generator 115, such as that shown in FIG. 17, a digital-type signal is emitted and travels through the wires 116 to the polarized connectors 144 for the switch disclosure. This signal is amplified by the circuit board 140 powered by the battery 138 to advance the odometer wheel as previously described.

The present invention essentially permits a universal-type remote meter reading system that can operate on almost any type of meter generating-type system. Hence, the remote reading type system 110 shown in FIGS. 13-16 and the remote reading type system 111 shown in FIG. 17 can be used in areas that include many types of different meter generators 114, 115 resulting in a single reader-type system 110 or 111. Further, the remote reader 118 (FIG. 18) can be retrofitted with a radio-generating signal to transmit the meter information, such as a volume of water passing through the water meter 112, to a remote data collection system (sometimes referred to as a concentrator) or sent through various telephone or other communication means via circuitry provided on the circuit board.

The present invention utilizing the stepper motor 134 replaces most, if not all, of the gearing required for prior art remote readers. Further, the present invention can be retrofitted with a feature to adjust a setting on the odometer 132 for correlating the odometer reading to the reading of the meter 112.

Figure 19:
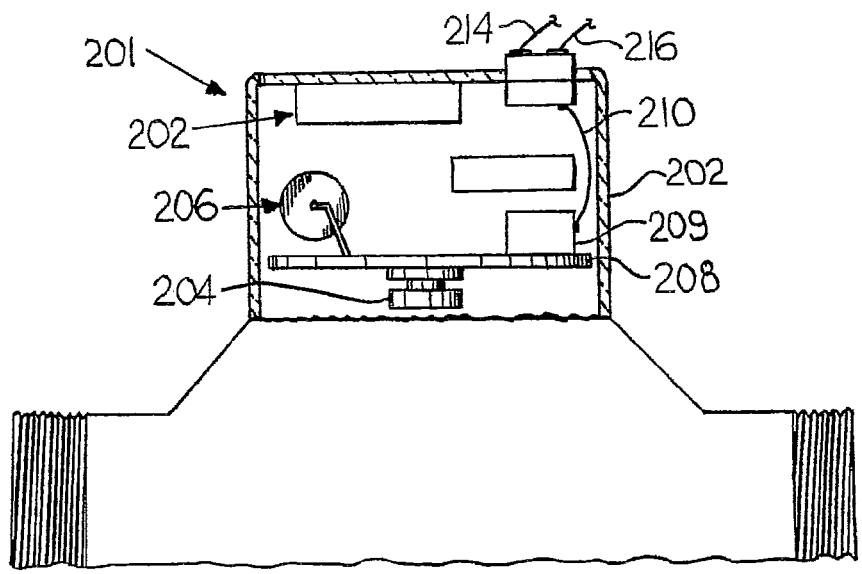
FIG. 19 is a side elevational view of a prior art water meter.

FIG. 19 shows a prior art water meter 200 that has a meter register 201 that includes an LCD or LED odometer display 202, Hall-effect switch, a reed switch or wiegand wire pickup 204, a battery power source 206, and a circuit board 208 having a microprocessor for converting raw signals from the reed switch, Hall-effect switch or wiegand wire pickup 204 to the odometer display 202. A hard-wired connection 210 can be provided to electrically couple a raw signal from the circuit board 208 to a remote reader 212 via wires 214 and 216. Examples of these types of meter registers are manufactured by many meter manufacturers, such as Master Meter, for multi-jet meters, positive displacement meters, and turbine meters.

Figure 20:
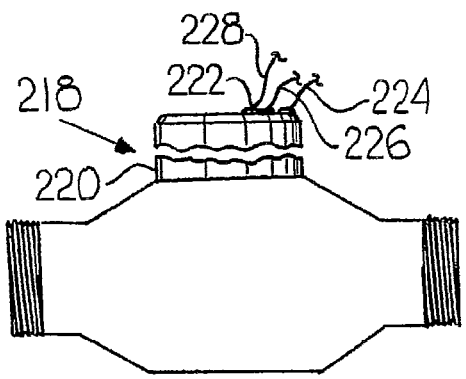
FIG. 20 is a side elevational view of another prior art water meter.

FIG. 20 shows another prior art meter 218 that includes an encoder 220 having terminals 222 for receipt of wires 224, 226 and 228 to electrically couple a raw signal from the encoder 220 to the remote reader 212. Such an encoder can be, but not limiting the invention thereto, a Sensus® ECR or Neptune ARB on a PD, turbine or compound meter.

Figure 21:
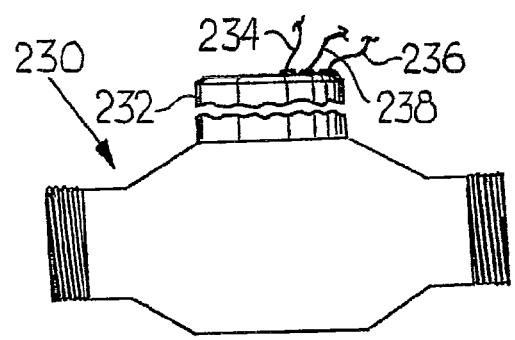
FIG. 21 is a side elevational view of still another prior art water meter.

FIG. 21 shows another prior art meter 230 that includes a generator remote register 232 that includes a terminal 234 for receipt of wires 236 and 238 to electrically couple a signal from the generator remote register 232 to the remote reader 212. Such meter registers are Master Meter® Electrical Output Register, Sensus® GTR, as well as registers manufactured by AMCO Elster, Neptune, and Badger.

Although the meters shown in FIGS. 19-21 are acceptable, there are problems when there is meter register failure. Another drawback of these meter registers is that the meter registers are read by a meter reader, and the trend is to eliminate manual reading by using remote radio-frequency reading. However, in the case of electronic meter registers, there can be a serious drain on existing batteries and, in the case of municipalities having older registers that still have many years of life left, there is a substantial expense to replace the older meter registers.

Figure 22:
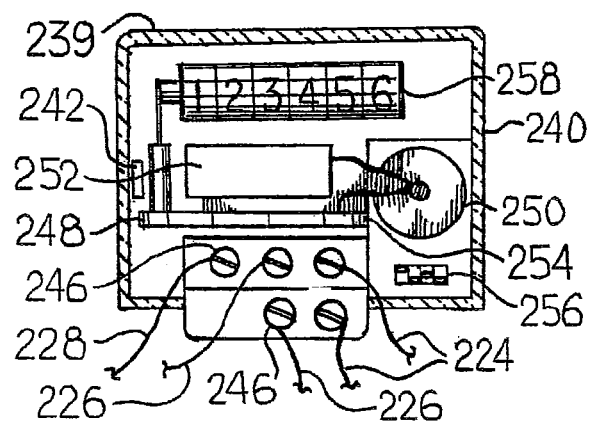
FIG. 22 is a side elevational view of a remote meter reader made in accordance with the present invention.

In these situations, remote reader 239 shown in FIG. 22 can be provided. The remote reader 239 is similar to remote reader 118 but preferably is attached to an exterior or interior of a building or house. The remote reader 239 includes a body 240, an antennae/receiver arrangement 242, wire terminals 246, a microprocessor 248, a replaceable battery or power source 250, a stepper motor 252, a circuit board controller 254 and DIP switches 256 coupled to the circuit board 254. The respective wires 214, 216 or 224, 226, 228 or 236, 238 are coupled to appropriate terminals 246. Either separate screw terminals are used for each type of signal generated by a specific meter or the microprocessor 248 selects the proper processing as programmed by DIP switches 256. The terminals 246 are electrically coupled to the microprocessor 248, the circuit board controller 254, and battery 250. The appropriate signals received from the wires 214, 216 or 224, 226, 228 or 236, 238 then drive the stepper motor 252, which is electrically coupled to the circuit board controller 254. This, in turn, causes a mechanical display 258 of the remote reader 212 to change in a similar manner as described previously herein with respect to remote reader 118. Also, a signal may be emitted from the antennae/receiver arrangement 242 so that a meter reading may be remotely read via radio signals. Driving the stepper motor and signal generation of the antennae require a substantial amount of power as compared to an LED display of the register 201 shown in FIG. 19. Hence, the separate replaceable power supply provided with the remote reader 212 enables easy battery replacement should that become necessary. Further, the mechanical display 258 ensures that, should a failure occur on the displays of the LED/LCD of the meter registers, at least an intermittent reading can be obtained from the last reading of the meter.

The present invention permits utilities to gradually phase in and replace meters to convert them from indoor meter reading requirements to outdoor/radio meter reading without prematurely replacing the meters. This can save time and money resources for a utility. In other words, the present invention permits utilities, particularly small and midsize utilities, to gradually upgrade to radio reading without scrapping encoder or generator meters, or replacing relatively new meters. The present invention permits upgrades of a utility meter reading system via phasing in the new system at a rate supported by the utility budget.

The form of the invention shown and described above represents illustrative non-limiting embodiments of the invention. It is understood that various changes may be made without departing from the teachings of the invention defined by the claimed subject matter that follows.

The invention claimed is:

1. A retrofit meter register compatible with a plurality of utility meter types to replace a pre-existing meter register operating with a pre-existing utility meter type of a type included in the plurality of types, the pre-existing meter register having a measuring system and the pre- existing utility meter having a moveable measuring element mounted in a flow chamber of a body of the pre-existing utility meter, wherein the measuring element of the pre-existing utility meter moves as a volume of utility material moves through the flow chamber past the measuring element of the pre-existing utility meter and movement of the measuring element of the pre-existing utility meter acts on the measuring system of the pre-existing meter register to generate a signal defined as a first signal having information regarding the volume of utility material passing through the flow chamber of the pre-existing utility meter, wherein the body and the measuring element of the pre-existing utility meter have identifying physical and performance characteristics that are used in determining the volume flow of utility material through the flow chamber of the pre-existing utility meter, the retrofit meter register comprising:
  a retrofit meter register measuring system operable to be connected to the measuring element of the pre-existing utility meter, the retrofit meter register measuring system generating a signal defined as a second signal having information regarding the volume of utility material passing through the flow chamber, the second signal being generated as the volume of material moves the measuring element as the material flows through the chamber of the pre-existing utility meter past the measuring element of the pre-existing utility meter;
  a microprocessor capable of emulating signals from a pre-defined group of different types of meter registers, wherein each of the meter registers of the group is associated with a type of utility meter of a group of different types of utility meters, wherein the pre-existing utility meter having the pre-existing meter register being replaced is one of the utility meters of the group of different types of utility meters; and
  a signal receiver to receive a predetermined signal from outside the retrofit meter register, wherein the predetermined signal identifies the pre-existing meter register, and wherein the microprocessor, upon receipt of the predetermined signal, configures the retrofit meter register using physical and performance characteristics of the pre-existing utility meter stored within the microprocessor to function as the pre-existing meter register, and wherein the retrofit meter register, upon being configured, generates a second signal having information regarding the volume of utility moving through the flow chamber past the measuring element of the pre-existing utility meter, which emulates the first signal, and wherein the volume of utility is determined using the second signal upon replacement of the pre-existing meter register with the configured retrofit meter register.

2. A retrofit meter register compatible with a plurality of existing utility meter types, the retrofit meter register comprising:
  a signal receiver to receive transmitted signals from more than one type of utility meter defined as a group of meters having a predetermined meter register, the transmitted signal from each one of the type of meters of the group of meters providing information to identify the volume of material passing through the meter associated with the transmitted signals;
  a microprocessor configured to receive the signals from the signal receiver, the microprocessor adapted to analyze the transmitted signals to configure the retrofit meter register to function as the predetermined utility meter register of one of the utility meters of the group of meters, and to measure the volume of material passing through the meter associated with the transmitted signal upon the configuration of the retrofit meter register;
  and a controller acting on the microprocessor to couple the microprocessor to the transmitted signal of the particular one of the meters of the group of meters to analyze the signal from the particular meter of the group of meters, wherein the microprocessor analyzes the transmitted signal from the particular meter of the group of meters and measures flow information of the particular meter of the group of meters, wherein the signal receiver is adapted to transmit signals and the microprocessor generates and sends to the signal receiver a signal identified as a second signal having information relating to the flow information of the particular meter of the group of meters, wherein the signal receiver transmits the second signal.

3. The meter register of claim 2, wherein the controller sends a signal defined as a third signal to the microprocessor to couple the microprocessor to the particular meter of the group of meters.

4. The meter register of claim 3, wherein the controller is a bank of switches which set in a particular position couples the microprocessor to the selected one of the meters of the group of meters.

5. The meter register of claim 3, wherein the controller is a signal controller and sends a signal to the microprocessor to couple the microprocessor to the particular meter of the group of meters.

6. The meter register of claim 5, wherein the signal controller is adapted to receive a coupling signal transmitted to the meter register to couple the microprocessor to the particular meter of the group of meters.

7. A retrofit meter register compatible with a plurality of existing utility meter types, the retrofit meter register comprising:
   a signal receiver to receive transmitted signals from more than one type of utility meter defined as a group of meters each having a predetermined meter register, the transmitted signal from each one of the type of meters of the group of meters providing information to identify the volume of material passing through the meter associated with the transmitted signals;
   a microprocessor configured to receive the signals from the signal receiver, the microprocessor adapted to analyze the transmitted signals to configure the retrofit meter register to function as the predetermined utility meter register of one of the utility meters of the group of meters, and to measure volume of material passing through the meter associated with the transmitted signal upon the configuration of the retrofit meter register;
   and a controller acting on the microprocessor, wherein the controller sends a signal to the microprocessor to couple the microprocessor to the transmitted signal of the particular one of the meters of the group of meters to analyze the signal from the particular meter of the group of meters, wherein the microprocessor analyzes the transmitted signal from the particular meter of the group of meters and measures flow information of the particular meter of the group of meters, wherein the controller is a bank of switches which set in a particular position couples the microprocessor to the selected one of the meters of the group of meters via said configuring.

8. The meter register of claim 1, wherein the measuring system of the retrofit meter register further includes a numerical display to visually present the flow information of the particular meter of the group of meters.

9. The meter register of claim 1, wherein the predetermined signal is transmitted by wires connected to the signal receiver of the retrofit meter receiver.

10. The meter register of claim 1, wherein the signal receiver and the particular meter of the group of meters are connected by an arrangement comprising a transmitting antenna and a receiving antenna.

11. The meter register of claim 1, wherein the signal receiver and the microprocessor are in a sealed unit.

12. A retrofit meter register compatible with a plurality of utility meter types to replace a pre-existing meter register operating with a pre-existing utility meter type of a type included in the plurality of types, the pre-existing meter register having a measuring system and the pre-existing utility meter having a moveable measuring element mounted in a flow chamber of a body of the pre-existing utility meter, wherein the measuring element of the pre-existing utility meter moves as a volume of utility material moves through the flow chamber past the measuring element of the pre-existing utility meter and movement of the measuring element of the pre-existing utility meter acts on the measuring system of the pre-existing meter register to generate a signal defined as a first signal having information regarding the volume of utility material passing through the flow chamber of the pre-existing utility meter, wherein the body and the measuring element of the pre-existing utility meter have identifying physical and performance characteristics that are used in determining the volume flow of utility material through the flow chamber of the pre-existing utility meter, the retrofit meter register comprising:
   a signal receiver to receive the transmitted first signals from more than one type of meter of the plurality of meter types, the first signals providing information to identify the volume of material passing through the meter associated with the transmitted signal;
   a retrofit meter register measuring system operable to be connected to the measuring element of the pre-existing utility meter, the retrofit meter register measuring system generating a signal defined as a second signal having information regarding the volume of utility material passing through the flow chamber, the second signal being generated as the volume of material moves the measuring element as the material flows through the chamber of the pre-existing utility meter past the measuring element of the pre-existing utility meter;
   a microprocessor comprising means for (a) receiving a predetermined transmitted signal from the pre-existing utility meter, the signal comprising information to configure the retrofit meter register to emulate the pre-existing meter register being replaced, the signal comprising physical and performance characteristics of the pre-existing meter, (b) configuring the microprocessor to receive the transmitted signals from the signal receiver, and (c) adapting the microprocessor to analyze transmitted signals to measure a volume of material passing through the meter associated with the transmitted signal, wherein the means are performed on the retrofit meter register replacing the pre-existing meter register; and a controller acting on the microprocessor to configure the microprocessor using physical and performance characteristics of the pre-existing utility meter stored within the microprocessor to measure flow information of the particular meter upon replacement of the pre-existing meter register with the retrofit meter register, and a means to make the measured flow information of the particular meter using the retrofit meter register, available.

13. The meter register of claim 12, wherein the microprocessor comprises means for converting the flow information to a flow rate signal and for forwarding the flow rate signal to a transmitting antenna.

14. A retrofit meter register compatible with a plurality of existing utility meter types, the retrofit meter register comprising:
   a signal receiver to receive transmitted signals from more than one type of utility meter defined as a group of meters each having a predetermined meter register, the transmitted signals from each one of the type of meters of the group of meters provides information to identify the volume of material passing through the meter associated with the transmitted signal;
   a microprocessor comprising means for
   (a) receiving information to configure a selected one of the transmitted signals to function as the predetermined utility meter register of one of the utility meters of the group of meters,
   (b) configuring the microprocessor to receive the transmitted signals from the signal receiver, and
   (c) adapting the microprocessor to analyze the transmitted signals to measure volume of material passing through the meter associated with the transmitted signal upon configuration of the retrofit meter register as the predetermined particular meter register for one of the meters of the group of meters;

a controller acting on the microprocessor to couple the microprocessor to the transmitted signal of the particular one of the meters of the group of meters to analyze the signal from the particular meter of the group of meters, wherein the microprocessor analyzes the transmitted signal from the particular meter of the group of meters and measures flow information of the particular meter of the group of meters, wherein the controller is a bank of switches which set in a particular position couples the microprocessor to the selected one of the meters of the group of meters via said configuring; and wherein the microprocessor further comprises a means to make the measured flow rate of the particular meter available.

15. The meter register of claim 12, wherein the retrofit meter register further includes a numerical display to visually present the flow information of the particular meter of the group of meters.

16. The meter register of claim 12, wherein the signal receiver of the retrofit meter and the meter associated with the transmitted signal are connected by wires.

17. The meter register of claim 12, wherein the signal receiver of the retrofit meter and the meter associated with the transmitted signal are connected by an arrangement comprising a transmitting antenna and a receiving antenna.

18. The meter register of claim 12, wherein the controller sends a signal to the microprocessor to couple the microprocessor to the predetermined signal of the particular one of the group of meters.

19. The meter register of claim 12, wherein the signal receiver, the microprocessor, the controller and the means are in a sealed unit.

20. A method of making a retrofit meter register compatible with a plurality of utility meter types to replace a pre-existing meter register operating with a pre-existing utility meter type of a type included in the plurality of types, the pre-existing meter register having a measuring system and the pre-existing utility meter having a moveable measuring element mounted in a flow chamber of a body of the pre-existing utility meter, wherein the measuring element of the pre-existing utility meter moves as a volume of utility material moves through the flow chamber past the measuring element of the pre-existing utility meter and movement of the measuring element of the pre-existing utility meter acts on the measuring system of the pre-existing meter register to generate a signal defined as a first signal having information regarding the volume of utility material passing through the flow chamber of the pre-existing utility meter, wherein the body and the measuring element of the pre-existing utility meter have identifying physical and performance characteristics that are used in determining the volume flow of utility material through the flow chamber of the pre-existing utility meter, comprising:

providing a retrofit meter register measuring system operatively connected to the measuring element of the pre-existing utility meter, the retrofit meter register measuring system generating a signal defined as a second signal having information regarding the volume of utility material passing through the flow chamber, the second signal being generated as the volume of material moves the measuring element as the material flows through the chamber of the pre-existing utility meter past the measuring element of the pre-existing utility meter;

providing a microprocessor capable of emulating signals from a predefined group of different types of meter registers, wherein each of the meter registers of the group is associated with a type of utility meter of a group of different types of utility meters, wherein the pre-existing utility meter having the pre-existing meter register being replaced is one of the utility meters of the group of utility different types of utility meters; and providing a signal receiver to receive a predetermined signal from outside the retrofit meter register, wherein the signal identifies the pre-existing meter register, providing a controller adapted to act on the microprocessor to couple the microprocessor to the particular one of meters of the group of meters to emulate the pre-existing meter register being replaced, and wherein the microprocessor, upon receipt of the signal, configures the retrofit meter register using physical and performance characteristics of the pre-existing utility meter stored within the microprocessor to function as the pre-existing meter register, and wherein the retrofit meter register, upon being configured, generates a second signal having information regarding the volume of utility moving through the flow chamber past the measuring element of the pre-existing utility meter, which emulates the first signal, and wherein the volume of utility is determined using the second signal upon replacement of the pre-existing meter register with the configured retrofit meter register, and providing a means to make measured flow rate of the meter coupled to the retrofit meter register available.

21. The method of claim 20 further comprising placing the signal receiver, the microprocessor, the controller and the means in a unit, and sealing the unit.

* * * * *